INVENTORS
MICHAEL D. RUTKOWSKI
ROBERT E. PLANK

BY Beveridge & De Grandi

ATTORNEYS

INVENTORS
MICHAEL D. RUTKOWSKI
ROBERT E. PLANK

BY

Beveridge & De Grandi

ATTORNEYS

United States Patent Office 3,711,395
Patented Jan. 16, 1973

3,711,395
GALVANIC CELLS
Robert E. Plank, Willow Grove, and Michael D. Rutkowski, Phoenixville, Pa., assignors to Biomarine Industries, Inc., Devon, Pa.
Filed June 6, 1969, Ser. No. 831,152
Int. Cl. G01n 27/46
U.S. Cl. 204—195 P                           3 Claims

ABSTRACT OF THE DISCLOSURE

A galvanic cell having a gas permeable membrane mechanically adhered or locked and sealed to a perforated electrode and this membrane-electrode structure is secured along its periphery to form a relatively rigid closure for one end of a housing filled with an electrolyte. The non-electrode side of the membrane is exposed to a fluid substance containing a component electro-active with the electrode material on the walls defining the perforations in the electrode. A second electrode is contained within the reservoir and a portion of the reservoir is closed by a flexible diaphragm whereby the reservoir is made volumetrically variable so as to make the galvanic cell bends proof and prevent formation of voids due to loss of water vapor from the electrolyte through the permeable membrane. External connections to the electrodes are provided in the form of an insulated disc having planar electrical conductors thereon and which disc forms a portion of the walls of the cell. A process for making the membrane-electrode structure is also disclosed. Consult the specification for further features and details.

---

Figure 1:
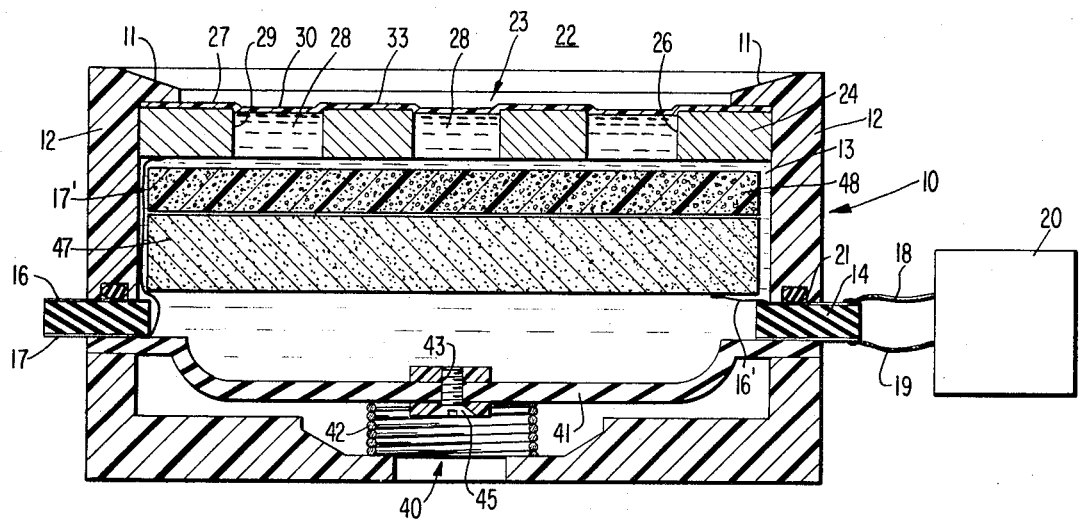

The present invention relates to sensors for use in analysis and control of fluids, particularly to improvements in galvanic cells and more particularly to improvements in oxygen partial pressure sensing galvanic cells.

In galvanic cells having a closed electrolyte system bounded by one or more walls that are permeable to water vapor and surrounded by an unsaturated atmosphere, a problem is introduced that is caused by loss of water from the electrolyte by way of permeation of water vapor through the permeable membrane. The problem becomes particularly significant in galvanic cells that are not periodically replenished with water or new electrolyte solutions. This loss of water or other components of the electrolyte over a period of a year or more is not significant in terms of weight loss because an adequate reservoir of electrolyte can be designed into the sensor body to prevent excessive cell dehydration. The significant problem, however, is evident when a bubble is formed in the electrolyte as the water void is replaced by atmospheric air or gas permeating back into the reservoir. In an electrochemical galvanic cell, this air bubble can cause cell polarization by locating itself between the cell electrodes. In the prior art there have been attempts to solve this problem by placing forces directly on the membrane to thus apply pressure to the electrolyte volume and at the same time maintain a uniform electrolyte space between the membrane and cathode electrode. The present invention solves this problem by means of a flexible, spring-biased substantially impermeable diaphragm forming one wall of the cell which is expanded upon filling under a vacuum and sealing the cell and constitutes a large reservoir of electrolyte. As water vapor permeates through the membrane during normal use of the cell, the spring biases the diaphragm in a direction to compensate for the lost water volume. In order to render the device bends proof, the reservoir is made volumetrically variable by not completely expanding the diaphragm during the filling operation. In this way, inert gases diffusing out of solution cause an expansion of the reservoir space or volume beyond the volume necessary to accommodate electrolyte. Because of the substantial rigidity and unique membrane-electrode structure, there is no problem maintaining dimensional and positional accuracy even though pressure is exerted on the membrane from the interior of the cell towards the exterior.

In normal galvanic cell construction, the membrane is under high tension and is stretched across an opening in the cell and or in close proximity to and in contact with one of the electrodes mounted on a post centrally in the cell. Wicks, grooves, or channels are usually provided to maintain electrolyte from a reservoir in and about the electrode. While some prior art devices propose to maintain a thin electrolyte space between the permeable membrane and the electrode to permit relatively immediate exposure or activity of permeating gases with active electrode via the thin electrolyte film in the space provided for same, if the membrane is not in some way secured to the electrode, there is a possibility of variation in the thickness of the electrolyte film with an attendant introduction of errors in signals produced. In the past, it has been proposed to print the electrode lines on the membrane or thin film deposit same either on the membrane or on a porous insulator and it has been proposed to press the membrane onto a porous sintered electrode. These expedients have proved to be difficult to manufacture and are relatively expensive structures and at times tend to have small pinholes or other defects formed in the membrane which renders them unsuitable for use in galvanic cells. In accordance with the present invention, the membrane is mechanically adhered or locked in perforations to a perforated electrode member which then may be securely fastened to the end of the housing containing the electrolyte reservoir. In this way, even though there is pressure exerted on the electrolyte so as to make up for water loss, the membrane-electrode structure described above, being secured along the periphery thereof, forms a substantially rigid structure which does not vary significantly in position during normal use of the device. More importantly since the active metal of the electrode is on the walls of the apertures, and each aperture is closed by membrane material, permeating gases are substantially instantaneously delivered to the active metal electrode within the perforations. In this way there is eliminated the need for a film of electrolyte or electrolyte space therefor and there are in purpose and effect, a plurality of miniature membranes, one for each aperture.

Normally electrical connections to the electrodes contacted by the electrolyte are by means of leads carried through bores, stoppers having terminals and other types of conventional electrical connections to the exterior of the device. In accordance with the present invention, a portion of the wall of the cell housing is in the form of an annular isulating disc having electrical conductors on each side thereof, the disc projecting interiorly and exteriorly by the walls of the housing. Seals are provided on the surfaces of the disc so as to prevent the passage of the electrolyte and electrical leads, secured as by soldering or otherwise, to the two electrodes in the electrolyte are secured to the upper and lower conductive surfaces of the disc, respectively, and exterior connections to the upper and lower conductors on said disc are made for connection to receive the signals produced by the cell.

Figure 3:
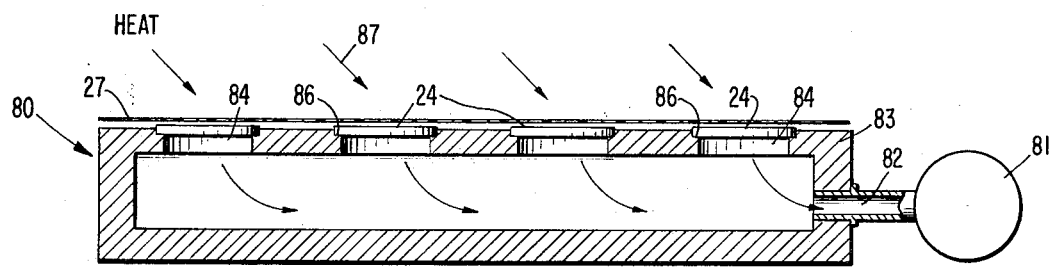
Figure 4:
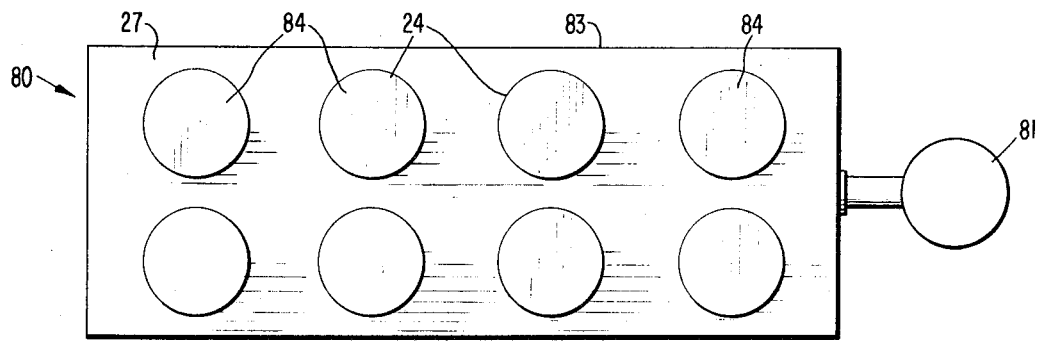
Figure 2:
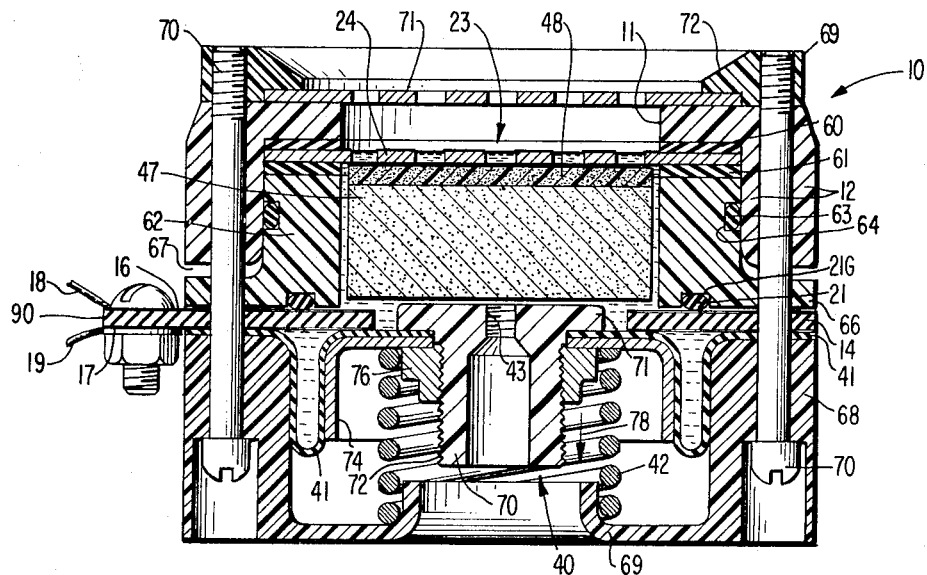
Figure 2A:
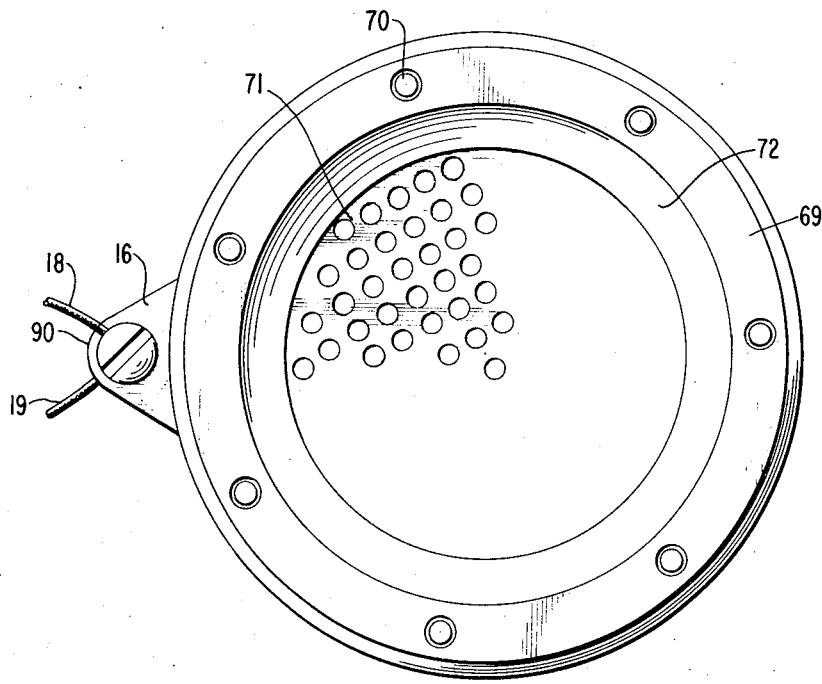

The above and other obvious advantages and features of the invention will become more apparent when considered in connection with the following specifications and drawings wherein:

FIG. 1 is a diagrammatic illustration of a galvanic cell incorporating the invention, FIG. 2 is a sectional view of a galvanic cell incorporating the invention, FIG. 2A is a top plan view thereof, FIG. 3 is a cross sectional view of a suction box device for fabricating the membrane-electrode structure according to the invention, and FIG. 4 is a top planned view of the device shown in FIG. 3.

With reference now to FIG. 1 there is diagrammatically shown a galvanic cell incorporating certain of the features according to this invention. FIG. 1 is diagrammatic in nature and is included to illustrate graphically the membrane electrode assembly and the functional operation of the biased diaphragm to be described in greater detail in connection with FIG. 2. It will be appreciated that the membrane-electrode structure has been greatly exaggerated dimensionally in relation to other components of the system for purposes of illustration.

Cell housing portion 10 which may be cylindrical, oval, or rectangular in cross section is formed from an insulating or non-conductive plastic with an inwardly projecting flange or lip 11 and sidewalls 12 to define a chamber 13. An annular insulating member 14, plated with a stainless steel conductive plating (other inactive conductive coating may be used) on its upper surface 16 and its lower surface 17 provide electrical connections for leads 18 and 19, respectively to an indicator or other utilization device 20. O ring 21 or other suitable sealing device provides a seal for electrolyte contained within chamber 13. The forward or outer end 22 of the galvanic cell is closed by means of a membrane-electrode structure 23 (greatly exaggerated dimensionally in relation to other components) which is comprised of a perforated stainless steel disc 24 having the surfaces thereof activated as by gold plating 26 (the size of the apertures and the thickness of disc 24 being described in greater detail hereinafter). Membrane 27 is on the exterior surface of electrode disc 24 and at each perforation 28 in disc 24, protuberances 30 in the membrane are drawn down into the perforation so as to engage the walls 29 of the perforations. A sufficiently strong mechanical adherence of the membrane 27 to electrode disc 24 is necessary to prevent separation thereof during normal use. This mechanical adherence is achieved by heating the membrane to its softening point to permit, it is believed, micro-mechanical bonding where the membrane material contacts the metal. As is described later herein during the course of manufacture of the electrode-membrane assembly 23, air between the membrane 27 and the unperforated surfaces 33 of disc 24 is removed or excluded as the mechanical locking action is effected under heat and negative pressure or vacuum.

The lower end of chamber 13 is closed by a spring biased flexible diaphragm assembly 40 which is described in greater detail in connection with FIG. 2 of the drawing. For the present purposes, it is illustrated as simply being a flexible member such as a rubber member 41 sealingly secured around its periphery to the lower surfaces of conductor disc 14. Flexible diaphragm 40 is shown in its fully extended or expanded position wherein compression spring 42 is shown fully compressed and exerting a force on the exterior surface of diaphragm 41 so as to compress the diaphragm. As will be explained more fully hereinafter, a filling port 43 is provided in diaphragm 41 and sealed as by means of a nylon screw 45 after filling. The preferred mode of filling with an electrolyte is to draw the diaphragm outwardly which compresses spring 42 and then fill with the electrolyte to the opening and then insert screw 45. Thus there is provided a substantial reservoir of electrolyte under pressure so that the loss of water vapor permeating through membrane protuberances 30 does not produce any voids or air bubbles within chamber 13. It will also be noted that within the chamber 13 there is a further electrode 47 which is a counter electrode (anode) and this electrode is perferably formed from a porous lead block or a wad of lead foil so as to have a large surface area exposed to electrolyte. Between counter electrode 47 and sensing electrode 24, is a porous insulator 48 which may be a non-conductive foam such as nylon foam, polyethylene foam or the like, which is inert relative to the electrolyte. As shown, electrode 47 may be supported in position by the inward projection of disc 14 and make direct electrical contact with conductor 16. However, it is preferred that such an electrical connection be made by conductor 16'. A similar conductor, 17' connects electrode 24 to conductor surface 17. Conductors 16' and 17' may be Monel or stainless steel or other nonactive conductor material.

In the structure illustrated, for use as a partial oxygen pressure sensor the electrolyte is a hydroxide of an alkali metal, for example potassium hydroxide (KOH), the catalytically active metal 29 on stainless steel disc 24 is gold and counter electrode 47 is a porous lead block. Membrane 27 is preferably Teflon having a thickness of about 1.5 mils; the gold plating being about 50 millionths of an inch and the thickness of the disc 24 is between about 8-12 mils. Obviously, for responding to other gases, the active metal, electrolyte and membrane materials may be changed to respond to such other gases. Since the periphery of disc 24 is clamped, it can be made thinner and still provide the desired rigidity, a preferred thickness being about 8 mils. While polyethylene and many other membranes may be used, and polyethylene does in fact have a slightly better response than does the Teflon, polyethylene has a hysteresis with temperature curve which is considerable. so even though polyethylene has a faster response, accuracy is lost when there are wide temperature variations.

Accordingly, it is preferred to use Teflon in place of polyethylene. The apertures or openings 28 in disc 24 have a diameter of about 8 mils and the openings are in staggered rows and spaced on about 16 mil centers, the rows being about 14 mils apart. The membrane protuberances 39 project into apertures 28 about one mil and each protuberance in purpose and effect constitutes a miniature membrane or window. There is no tension in membrane 27 thus eliminating a source of inaccuracy in prior art devices due to cold flow properties of the membrane material. Since the distances from different areas of the protuberances 30 to the walls of the perforations via the electrolyte are always fixed by the locking action described earlier, there is an elimination of another source of error. Since this distance is very small (and at some places infinitesimal) the response time is reduced. Moreover, the problem of achieving consistently reproducible results is minimized and since the cross-sectional area of each protuberance is small the hydraulic force of internal pressure on same is insignificant. Nevertheless, by providing a large number of protuberances and perforations, the effective area of permeable membrane is equivalent to prior art devices, as well as is the active area of gold. In fact, since the walls of the perforations constitute the active metal areas, the active area of active metal is increased, and the galvanic activity of devices constructed according to the invention is sufficient to produce voltages sufficient to operate an indicating meter directly. As is usual, temperature compensation may be achieved by the thermistor (not shown) subject to ambient electrolyte temperature and connected across the output circuit.

Referring now to FIG. 2 and FIG. 2A (in which elements corresponding to elements in FIG. 1 bear the same numbers) cell housing portion 10 is an annulus having sidewalls 12 and an overlying lip portion 11. Seal element 60 is between the lower surface of lip 11 and the upper peripheral surface of membrane-electrode assembly 23. Preferably disc 24 is unperforated in the peripheral clamping area thereof. On the lower surface of the membrane-electrode assembly 23 is a further annular sealing element 61 (it being appreciated that sealing elements 60 and 61 may be replaced with O rings). An annular clamping element 62 is telescopically fitted within annular cell housing portion 10 and is provided with an O ring sealing member 63 in annular groove 64. Clamping member 62 has an outwardly projecting annular flange 66, the lower surface of which bears against the conductively plated upper surfaces of insulating disc 14, sealing O ring 21 being provided in annular groove 21G. It will be noted that there is a small space 67 between the upper surface of annular flange 66 and the lower surface of walls 12 of the cell housing portion 10 which permits as much clamping pressure as is desired to be applied to membrane electrode 23. The peripheral edges of diaphragm 41 are clamped between the lower surfaces of insulator disc 14 and the upper peripheral edge surfaces of cup-shaped member 68.

The peripheral edges of cup-shaped member 68, annular insulating disc 14, flange 66 on membrane-electrode clamp member 62, walls 12 of cell housing element 10 and an upper annular element 69 are provided with aligned bore holes through which securing and clamping screws 70 pass, the bores of upper annular element 69 being provided with threads to receive the threaded ends of clamping screws 70.

A perforated protector disc 71 through which air or other gases or fluids freely pass is clamped between lip or flange 72 and the upper surface of cell housing portion 10. In the assembly as shown, seals 60, 61, 63, 21, and the peripheral edges of diaphragm element 41 effectively seal the electrolyte within the reservoir chamber after the device is filled with an electrolyte. The peripheral edges of diaphragm 41 may be of waffle configuration to provide a plurality of annular ridges which likewise prevent leakage of electrolyte from the unit.

Whenever screws or fastener members 70 are tightened, force is exerted through the upper annular edge of element 68 against the insulating disc 14 which transmits this compressive force to the electrode-membrane clamping element 62. Thus, the peripheral edges of electrode-membrane assembly 23 is effectively secured or clamped by this clamping action between sealing washers 60 and 61. This in effect rigidifies membrane-electrode assembly 23 and prevents any distortion thereof during normal use of the device and preventing any movement of the diaphragm relative to the electrode per se.

Filling with electrolyte is by means of a fitment centrally located in the diaphragm 41. This fitment includes a central element 70 having a diaphragm clamping flange 71, a threaded filling port or opening 43 and an exteriorly threaded shank portion 72. A cup shaped spring receiving member 74 having an aperture through which the threaded shank 72 passes is forced into clamping relation with flange 73 by a lock nut 76 to thereby clamp and seal the diaphragm to the fitment. Closure element 68 has an inwardly projecting shoulder or flange 69 and between shoulder 69 and member 74 is a compression spring 42 which, in the conditions shown in FIG. 2 is in a fully extended position whereby the volume of the space for receiving electrolyte in the cell is at a minimum.

In order to fill the unit thus described with electrolyte, a threaded filling pipe is threaded onto the exterior threads 72 of shank 70 and shank 70 is drawn downwardly through the opening as illustrated by the arrow 78. In order to render the device bends proof, shank 70 is not drawn completely down. In this way after filling with electrolyte sufficient room for expansion is provided to accommodate helium gas diffusion from the electrolyte. The device is placed in a vacuum and electrolyte is then poured or passed through opening 43 to fill the space with electrolyte and a nylon sealing screw 45 is inserted in the opening 43 to seal or close same. The force drawing shank 70 outwardly is then removed to permit compression spring 42 to thereby apply pressure on pressure member 74 and diaphragm 41 in the direction of membrane-electrode assembly 43 to thereby tend to reduce the space provided for the volume of electrolyte. Thus, as water vapor in electrolyte within the reservoir permeates or evaporates through membrane-electrode assembly 23, this loss of volume is effectively compensated for by movement of the diaphragm 41 by spring 42 to thereby prevent the formation of any void in the chamber which may become filled with air permeating from the atmosphere. In order to permit relatively inert gases which have come into solution with the electrolyte via the membrane to diffuse out of solution, the reservoir is not completely filled with electrolyte to leave room for volumetric expansion of the reservoir to accommodate such gases.

As described earlier herein, the upper and lower surfaces of insulating disc 14 are conductively plated with stainless steel to form planar conductors on the upper and lower surfaces thereof.

As shown in FIG. 2, insulating disc 14 has a projection 90 on the left side of the assembly as shown in FIG. 2. In this instance, wires 18 and 19 are maintained in contact with the upper and lower conductive surfaces, respectively, by an insulated nut and screw, but it will be appreciated that such leads may be soldered and that the insulating disc 14 may project completely around on all sides of the assembly so that it may be installed at any angular orientation and the electrical connections can be made at any point or a slip-on connector may be simply slid onto the disc at any projection in a manner conventional with printed circuit technology.

With reference now, to FIGS. 3 and 4, there is illustrated a device for fabricating membrane-electrode structure 23. As illustrated, a vacuum box or manifold 80 connected to a source of negative pressure or vacuum 81 through a pipe 82 has an upper or cover membrane 83 which is provided with a plurality of openings 84 shaped in conformity with the peripheral outline of electrode disc 24. Shoulders or support surfaces 86 are provided on which rest discs 24. In the device shown, there are eight such openings so eight membrane-electrode assemblies are fabricated in one operation. One such electrode disc is placed in each opening and then a sheet of membrane material 27' is laid over the entire assembly and vacuum, at about 2 inches of mercury is applied.

At the same time, heat is applied as indicated by the arrows 87. The temperature is about 500° F. or where Teflon just begins to soften. The negative pressure or vacuum produced by vacuum source 81 is sufficient to draw down portions of membrane element 27 into the apertures of perforations 28 in the electrode disc members 24 to form the projections or protuberances 30 and mechanically lock or adhere the membrane material in each aperture to form miniaturized membranes or gas permeable windows.

After the protuberances 30 have been formed to lock the membrane material to the electrode disc 24, the vacuum is removed and the individual membrane-electrode units are formed by severing around the peripheral edges of the electrodes to thus remove excess membrane material.

As an alternative method discs 24 have been heated in an oven having a temperature of about 1000° F. Precut discs of Teflon are laid on such discs while heated and good mechanically stable membrane-electrode assemblies have been made thereby.

The membrane-electrode structures thus formed are relatively rugged and when the peripheral edges thereof are clamped in the manner disclosed in FIG. 2 are relatively rigid. The protuberances 30, being of very small diameter and effectively locked in the apertures are likewise essentially rigid so that errors due to displacement of membranes relative to electrode or variation in electrolyte between membrane and electrode is essentially eliminated thus providing for greater accuracy and faster response time at the essentially critical areas of electrochemical activity.

Although compression spring 42 causes diaphragm 41 to move in the direction of membrane-electrode assembly 23, and thus apply some pressure to the electrolyte within the chamber, this force is designed to be just sufficient to reduce the reservoir of volume in proportion to the amount of water vapor permeating from the electrolyte through electrode-membrane assembly 23 and hence, the force is insufficient to significantly affect the response and/or accuracy of the measurements made. Moreover, such spring permits an enlargement of the volume of the reservoir space to permit gases to diffuse from the electrolyte to expand same.

Although the invention has been described in particularity with respect to one disclosed embodiment, it is to be understood that various modifications and changes in the details and construction and arrangement of parts can be made without departing from the scope and spirit of the invention.

What is claimed is:

1. In a galvanic cell including a chamber closed at one end by a membrane-electrode assembly, an electrolyte in said chamber, a counter electrode in said chamber and a pair of conductors electrically connected to said counter electrode and the electrode of the membrane-electrode assembly, the improvement comprising, a non-conductive frame member forming a portion of the walls of said chamber, said frame extending interiorly and exteriorly of said chamber, planar conductor means on two opposed surfaces of said frame and extending interiorly and exteriorly of said chamber with said frame member, one conductor of said pair being connected to one of said planar conductor means and the other conductor of said pair being connected to the other of said planar conductor means.

2. A galvanic cell comprising in combination, a hollow non-conductive housing member having an inwardly projecting flange at one end thereof, a membrane-electrode assembly comprising a metal disc electrode having a plurality of apertures therein with at least the wall surfaces defining said apertures being electrolytically active with respect to a selected component in a fluid mixture, and a thin membrane, permeable to said selected component, mechanically bonded to said electrode disc to form a plurality of thin, permeable windows, said membrane-electrode structure having a peripheral clamping and sealing edge abutting said inwardly projecting flange in said hollow housing member, means telescoped within said hollow housing member engaging said peripheral clamping and sealing edge of said membrane-electrode structure, means urging said means telescoped in said housing member in a direction to clamp the said peripheral clamping and sealing edge of said membrane-electrode structure between said inwardly projecting flange and said means telescoped in said housing, a flexible diaphragm closing an end of said hollow member to form a volumetrically variable chamber, a counter electrode in said chamber, and electrolyte filling said chamber and conductor means connected to said electrodes and extending to the exterior of said chamber.

3. The invention defined in claim 2 wherein said flexible diaphragm is capable of extending outwardly of said chamber to enlarge said chamber and accommodate gases diffusing out of solution with said electrolyte.

References Cited

UNITED STATES PATENTS

| | | | |
|---|---|---|---|
| 3,088,905 | 5/1963 | Glover | 204—195 |
| 3,134,697 | 5/1964 | Niedrach | 136—86 R |
| 3,235,477 | 2/1966 | Keyser et al. | 204—195 |
| 3,239,444 | 3/1966 | Heldenbrand | 204—195 |
| 3,385,736 | 5/1968 | Deibert | 136—86 R |
| 3,429,796 | 2/1969 | Lauer | 204—195 |
| 3,503,861 | 3/1970 | Volpe | 204—195 |
| 3,510,420 | 5/1970 | Mills | 204—195 |
| 3,510,421 | 5/1970 | Gealt | 204—195 |
| 3,574,078 | 4/1971 | Hynes et al. | 204—195 |
| 3,577,332 | 5/1971 | Porter et al. | 204—195 |

TA-HSUNG TUNG, Primary Examiner